US012455199B2

(12) United States Patent
Sabraoui et al.

(10) Patent No.: US 12,455,199 B2
(45) Date of Patent: Oct. 28, 2025

(54) METHOD OF MEASURING THE TEMPERATURE OF WATER IN A METER

(71) Applicant: SAGEMCOM ENERGY & TELECOM SAS, Rueil Malmaison (FR)

(72) Inventors: Abbas Sabraoui, Rueil Malmaison (FR); Henri Teboulle, Rueil Malmaison (FR); Oussama Abid, Rueil Malmaison (FR); Guillaume Lecocq, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 803 days.

(21) Appl. No.: 17/519,250

(22) Filed: Nov. 4, 2021

(65) Prior Publication Data

US 2022/0146330 A1 May 12, 2022

(30) Foreign Application Priority Data

Nov. 9, 2020 (FR) ...................................... 2011499

(51) Int. Cl.
*G01K 11/24* (2006.01)
*G01F 1/66* (2022.01)
(Continued)

(52) U.S. Cl.
CPC ................ *G01K 11/24* (2013.01); *G01F 1/66* (2013.01); *G01F 1/668* (2013.01); *G01F 15/022* (2013.01);
(Continued)

(58) Field of Classification Search
CPC ...... G01K 11/24; G01K 13/02; G01K 13/026; G01K 17/00; G01F 1/66; G01F 1/668; G01F 15/022; G01P 5/245
See application file for complete search history.

(56) References Cited

U.S. PATENT DOCUMENTS

| 4,445,389 A | * | 5/1984 | Potzick | ................... G01F 1/667 |
| | | | | 73/861.27 |
| 5,856,622 A | * | 1/1999 | Yamamoto | .............. G01F 1/668 |
| | | | | 73/861.28 |

(Continued)

FOREIGN PATENT DOCUMENTS

| WO | WO2019002145 A1 | 1/2019 |
| WO | WO2020100157 A1 | 5/2020 |

*Primary Examiner* — Laura Martin
*Assistant Examiner* — Philip L Cotey
(74) *Attorney, Agent, or Firm* — MUNCY, GEISSLER, OLDS & LOWE, P.C.

(57) ABSTRACT

A measurement method for measuring the temperature of water in a meter includes the steps of: causing an emitter transducer of the meter to emit an ultrasonic measurement signal, and acquiring an electrical measurement signal produced by a receiver transducer of the meter; measuring a speed of the ultrasonic measurement signal in the water and a level of the electrical measurement signal; using the level of the electrical measurement signal to determine whether the temperature of the water is less than or greater than an inflection temperature corresponding to a point of inflection; estimating the temperature of the water from the speed of the ultrasonic measurement signal by using a first formula if the temperature of the water is less than the inflection temperature, and by using a second formula if the temperature of the water is greater than the inflection temperature.

14 Claims, 4 Drawing Sheets

(51) Int. Cl.
 *G01F 1/667* (2022.01)
 *G01F 15/02* (2006.01)
 *G01K 13/02* (2021.01)
 *G01K 17/00* (2006.01)
 *G01P 5/24* (2006.01)

(52) U.S. Cl.
 CPC ............ *G01K 13/02* (2013.01); *G01K 13/026* (2021.01); *G01K 17/00* (2013.01); *G01P 5/245* (2013.01)

(56) References Cited

U.S. PATENT DOCUMENTS

| | | | | |
|---|---|---|---|---|
| 6,224,255 | B1* | 5/2001 | Stadelmayer | H03K 9/08 374/170 |
| 10,980,360 | B2* | 4/2021 | Gschwind | B05B 1/3026 |
| 11,040,318 | B2* | 6/2021 | Salas Arranz | G01F 1/668 |
| 2003/0029242 | A1* | 2/2003 | Yaralioglu | G01N 29/326 374/119 |
| 2010/0014554 | A1* | 1/2010 | Albertson | G01N 25/02 374/144 |
| 2017/0138773 | A1* | 5/2017 | D'Souza-Matthew | G01F 1/662 |
| 2019/0381464 | A1* | 12/2019 | Salas Arranz | G05D 23/1931 |
| 2020/0109977 | A1* | 4/2020 | Sai | G01F 1/662 |

* cited by examiner

METHOD OF MEASURING THE TEMPERATURE OF WATER IN A METER

The invention relates to the field of meters that measure water consumption, and in particular to hot water meters and to thermal energy meters.

BACKGROUND OF THE INVENTION

An ultrasonic water meter conventionally comprises both a pipe through which the water flows and also two piezoelectric transducers comprising an upstream transducer and a downstream transducer. The transducers are placed the ends of a path that is defined in the pipe and that is of a length that is known accurately. The upstream transducer emits an ultrasonic measurement signal that travels along the path from upstream to downstream and that is received by the downstream transducer. The downstream transducer emits an ultrasonic measurement signal that travels along the path from downstream to upstream and that is received by the upstream transducer. The mean speed of the water is estimated from the difference between the travel times, and the flow rate of the water is calculated from its mean speed.

It is advantageous to be able to measure the temperature of the water in the meter, in particular with hot water meters and with thermal energy meters (TEM), which are capable of handling water at temperatures of up to 130° C.

Specifically, both water distributors and clients seek to have access to this information. When this information is available, the measurement of the water temperature is displayed on the LCD screen of the meter and it is transmitted by radio link to the water distributor.

With reference to FIG. 1, it is also known that for a given water flow rate, e.g. 6 liters per hour (L/h), the metrological error concerning the flow rate (curve C1) depends on the temperature of the water. It is therefore important to know the temperature of the water accurately in order to be able to apply the appropriate correction to the flow rate measurement and so as to guarantee that measurement performance complies with the OIML R-49 standard, which requires measurement accuracy to be within ±5%.

It is therefore quite conventional to incorporate a temperature probe in a hot water or thermal energy meter.

It should be observed that, when measuring thermal energy, two temperature probes are generally used in the client's installation: one probe at the inlet to the installation (positioned in the meter), and another probe at the outlet from the installation.

Having a probe present in the meter naturally increases the cost of the meter, and tends to reduce its reliability.

OBJECT OF THE INVENTION

An object of the invention is to reduce the cost and to increase the reliability of a water meter, but without that decreasing the accuracy of the measurements that it takes.

SUMMARY OF THE INVENTION

In order to achieve this object, there is provided a measurement method for measuring the temperature of water, the method being performed at least in part in a meter and comprising the steps of:

causing an emitter transducer of the meter to emit an ultrasonic measurement signal, and acquiring an electrical measurement signal produced by a receiver transducer of the meter when it receives the ultrasonic measurement signal after the ultrasonic measurement signal has travelled along a path of defined length in the water;

measuring a speed of the ultrasonic measurement signal in the water;

measuring a level of the electrical measurement signal;

using the level of the electrical measurement signal to determine whether the temperature of the water is less than or greater than an inflection temperature corresponding to a point of inflection in a curve plotting the speed of sound in water as a function of the temperature of the water;

estimating the temperature of the water from the speed of the ultrasonic measurement signal by using a first formula if the temperature of the water is less than the inflection temperature, and by using a second formula if the temperature of the water is greater than the inflection temperature.

The measurement method of invention thus makes it possible to estimate the temperature of the water from the speed of the ultrasonic measurement signal.

Unfortunately, the curve plotting the speed of sound in water as a function of the temperature of the water presents a point of inflection at an inflection temperature, in such a manner that the same speed of sound can correspond to two different water temperatures.

Fortunately, the level of the electrical measurement signal received by the receiver transducer varies in almost linear as a function of the temperature of the water. The level of the electrical measurement signal is thus used to determine whether the temperature of the water is located before or after the point of inflection, thus making it possible to select the "right" formula for estimating accurately the "right" temperature that corresponds to the measured speed of the ultrasonic measurement signal. The temperature of the water is thus measured in a manner that is very accurate, even for temperatures beyond the inflection temperature.

The measured water temperature can thus be used to correct the measurement of the flow rate of the water so that the measurements of its flow rate are very accurate, even without having a temperature probe present in the meter.

With a hot water meter, there is thus no longer any need to provide said meter with a temperature probe.

When measuring thermal energy, the probe in the meter can be omitted and taking a measurement requires only one probe (positioned at the outlet from the installation).

The meter is thus less expensive and more reliable.

There is also provided a measurement method as described above, including, for determining whether the temperature of the water is less than or greater than the inflection temperature, the step of comparing the level of the electrical measurement signal with a predefined threshold that is equal to a first reference level of the electrical measurement signal multiplied by a reference factor, the first reference level being previously measured during a stage of calibrating the meter while the temperature of the water is equal to a first reference temperature, and the reference factor corresponding to the variation in the level of the electrical measurement signal that is to be expected from the temperature difference between the first reference temperature and the inflection temperature.

There is also provided a measurement method as described above, wherein prior to putting the meter into service, the reference factor is calculated from at least one second reference level of the electrical measurement signal as measured while the temperature of the water is equal to a second reference temperature and from a third reference level of the electrical measurement signal as measured while the temperature of the water is equal to a third reference temperature.

There is also provided a measurement method as described above, wherein the second reference level and the third reference level are measured during the stage of calibrating said meter, the reference factor then being specific to said meter.

There is also provided a measurement method as described above, wherein the second reference level and the third reference level are measured for a plurality of other meters similar to said meter, and the reference factor is then common to a plurality of meters.

There is also provided a measurement method as described above, further comprising the steps of estimating a flow rate for the water by using the speed of the ultrasonic measurement signal, and of correcting the flow rate of the water by using the temperature of the water as estimated by the measurement method.

There is also provided a measurement method as described above, wherein the first formula and the second formula result respectively from a first equation and from a second equation for the speed of sound in water as a function of the temperature of the water, the first equation and the second equation being equations of the second degree.

There is also provided a measurement method as described above, wherein the first equation is:

$$Vs = -0.0325 \times T^2 + 4.4218 \times T + 1403.9$$

and the second equation is:

$$Vs = -0.0101 \times T^2 + 1.226 \times T + 1518.8,$$

where Vs is the speed of sound in water and where T is the temperature of the water.

There is also provided a measurement method as described above, wherein the level of the electrical measurement signal is equal to the mean of the amplitudes of a plurality of lobes, said lobes being situated in the middle of a portion of the electrical measurement signal in which said electrical measurement signal presents an amplitude that is substantially constant.

There is also provided a measurement method as described above, wherein the inflection temperature lies in the range 74° C.±2° C.

There is also provided a meter including at least one transducer and a processor component arranged to perform the measurement method as described above.

There is also provided a meter as described above, the meter being a water meter.

There is also provided a meter as described above, the meter being a thermal energy meter.

There is also provided a computer program including instructions that cause the processor component of the meter as described above to execute the steps of the measurement method as described above.

There is also provided a computer-readable storage medium, storing the above-described computer program.

The invention can be better understood in the light of the following description of a particular, nonlimiting implementation of the invention.

BRIEF DESCRIPTION OF THE DRAWINGS

Reference is made to the accompanying drawings, in which.

DETAILED DESCRIPTION OF THE INVENTION

Figure 1:
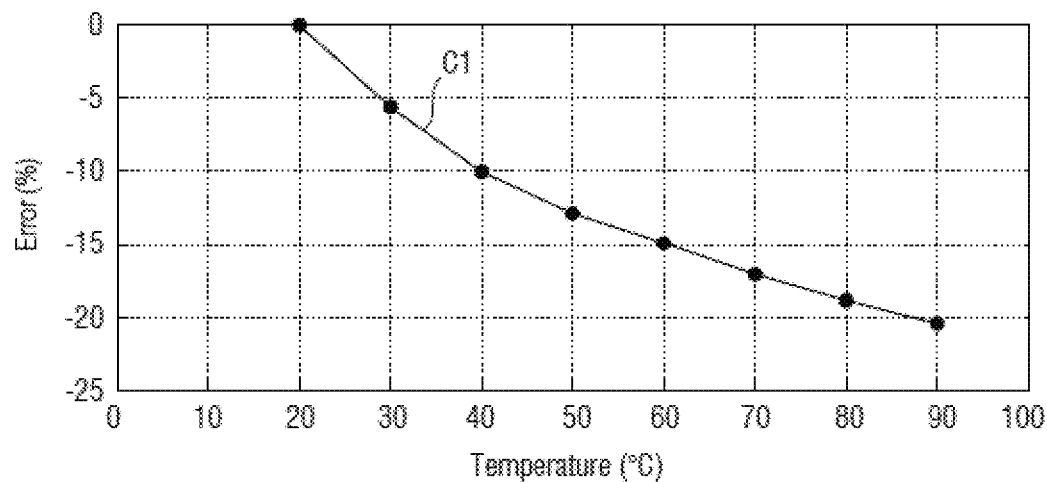
FIG. 1 shows a graph comprising a metrological error curve concerning the measurement of the flow rate of water as a function of the temperature of the water, for a flow rate of 6 L/h.
Figure 2:
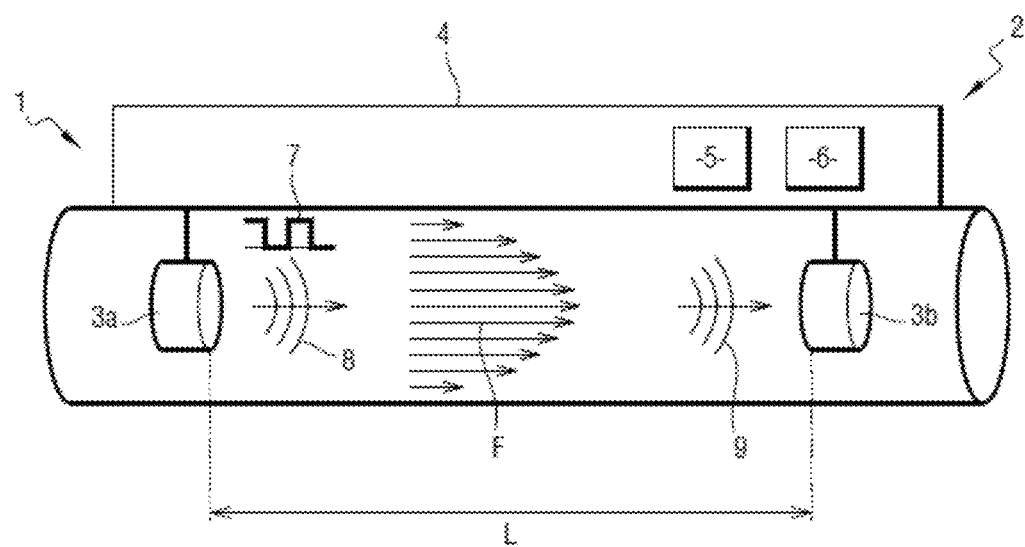
FIG. 2 shows an ultrasonic measuring device of a water meter in which the invention is performed.

With reference to FIG. 2, in this example, the invention is performed in a hot water meter 1 that is used for measuring the consumption of hot water supplied by a distribution network to the installation of a client.

The meter 1 comprises firstly a communication module that enables the meter 1 to communicate with an information system (IS) of the network manager, possibly via a data concentrator, a gateway, or indeed another meter (such as a district smart meter). The communication module may perform communication of any type, and for example communication via a cellular network of 2G, 3G, 4G, Cat-M, or NB-IoT type, communication using the long range (LoRa) protocol, radio communication using the Wize standard operating at the frequency of 169 megahertz (MHz), etc. At regular intervals, the meter 1 uses the communication module to transmit to the IS the measurements that have been taken.

The meter 1 also comprises both a pipe conveying the flow of water being supplied by the distribution network to the client's installation, and also an ultrasonic measuring device 2.

Water flows in the pipe from upstream to downstream, as indicated by the direction of arrows F.

The ultrasonic measuring device 2 includes an upstream transducer 3a and a downstream transducer 3b. The upstream transducer 3a and the downstream transducer 3b are paired. In this example, the upstream transducer 3a and the downstream transducer 3b are piezoelectric transducers.

The ultrasonic measuring device 2 also includes a measurement module 4 connected to the upstream transducer 3a and to the downstream transducer 3b.

The measurement module 4 includes a processor module comprising a processor component 5 that is adapted to execute instructions of a program for performing the measurement method of the invention. The program is stored in a memory that is connected to or incorporated in the processor component 5. By way of example, the processor component 5 may be a processor, a digital signal processor (DSP), a microcontroller, or indeed a programmable logic circuit such as a field programmable gate array (FPGA) or an application specific integrated circuit (ASIC).

The measurement module 4 also includes an analog to digital converter (ADC) 6 (possibly incorporated in the processor component 5).

The processor component 5 controls both the upstream transducer 3a and the downstream transducer 3b.

Each of the upstream and downstream transducers 3a and 3b acts in succession to perform the function of an emitter transducer and the function of a receiver transducer.

In FIG. 2, the upstream transducer 3a is shown as performing the function of an emitter transducer, and the downstream transducer 3b is shown as performing the function of a receiver transducer.

The processor component 5 generates an electrical excitation signal 7 and it delivers the electrical excitation signal 7 to the emitter transducer. The processor component 5 thus causes the emitter transducer to emit an ultrasonic measurement signal 8. The receiver transducer receives the ultrasonic measurement signal 9 after the ultrasonic measurement signal 8 has travelled through the water along a path of defined length L.

In this example, the path of defined length L is a rectilinear path between the upstream transducer 3a and the downstream transducer 3b. The defined length L is typically equal to 7 centimeters (cm). It should be observed that the distance L is measured accurately during a calibration stage performed in the factory before the meter 1 is put into service.

In this example, the electrical excitation signal 7 is a square wave signal of frequency $f_{us}$ and of period $T_{us}$. The frequency $f_{us}$ conventionally lies in the range 900 kilohertz (kHz) to 4 megahertz (MHz), and in this example it is equal to 1 MHz.

When the emitter transducer is the upstream transducer 3a, the ultrasonic measurement signal 8 thus travels between the upstream transducer 3a and the downstream transducer 3b from upstream to downstream along the path of defined length L.

When the emitter transducer is the downstream transducer 3b, the ultrasonic measurement signal travels between the downstream transducer 3b and the upstream transducer 3a from downstream to upstream along the path of defined length L.

The ultrasonic measurement signal 8 is emitted by the emitter transducer (the upstream transducer 3a in FIG. 2) at a level $N_E$. The ultrasonic measurement signal 9 is received by the receiver transducer (the downstream transducer 3b in FIG. 2) at a level $N_R$ that is lower than the level $N_E$.

The ADC 6 of the measurement module 4 digitizes the electrical measurement signal produced by the receiver transducer when it receives the ultrasonic measurement signal 9, and it produces measurement samples. For a signal of frequency $f_{us}$=1 MHz, the sampling frequency is typically 4 MHz in order to comply with the Shannon criterion. The processor component 5 acquires the digitized electrical measurement signal.

When the emitter transducer is the upstream transducer 3a, the processor component 5 uses the electrical measurement signal to measure the travel time taken by the ultrasonic measurement signal 8 travel from upstream to downstream along the path of defined length.

In reality, the processor component 5 measures a global transfer time $T_{AB}$ from the upstream transducer 3a to the downstream transducer 3b.

The global transfer time $T_{AB}$ is such that:

$$T_{AB}=TA_A+ToF_{AB}+TR_B, \text{ where:}$$

$TA_A$ is a switch-on time of the upstream transducer 3a;

$ToF_{AB}$ corresponds to the time of flight taken by the ultrasonic measurement signal 8 to travel along the path of defined length between the upstream transducer 3a and the downstream transducer 3b;

$TR_B$ is a reception time of the downstream transducer 3b.

Likewise, when the emitter transducer is the downstream transducer 3b, the processor component 5 measures the global transfer time $T_{BA}$ that is such that:

$$T_{BA}=TA_B+ToF_{BA}+TR_A, \text{ where:}$$

$TA_B$ is a switch-on time of the downstream transducer 3b;

$ToF_{BA}$ corresponds to the time of flight taken by the ultrasonic measurement signal to travel along the path of defined length between the downstream transducer 3b and the upstream transducer 3a;

$TR_A$ is a reception time of the upstream transducer 3a.

Assuming that:

$TA_A=TA_B$ and $TR_A=TR_B$ (paired transducers), then the following is obtained:

$$\Delta T=T_{BA}-T_{AB}=ToF_{BA}-ToF_{AB}=DToF,$$

where DToF is the differential time-of-flight.

However, the DToF is proportional to the mean speed of the water, so the processor module 5 can then calculate the mean speed of the water by using the DToF. The mean speed is signed and it may be positive, negative, or zero.

The processor component 5 then deduces the flow rate of the water flowing in the pipe of the meter 1 from the mean speed of the water.

The electrical measurement signal is thus used to produce a measurement of the flow rate of the water. However, as explained below, in the measurement method of the invention, the electrical measurement signal is also used to determine whether the temperature of the water is less than or greater than an inflection temperature. The inflection temperature corresponds to a point of inflection in a curve plotting the speed of sound in water as a function of the temperature of the water.

In this example, the inflection temperature is equal to 74° C.

In the measurement method of the invention, the temperature of the water is estimated from a measurement of the speed of the ultrasonic measurement signal in the water.

In order to estimate the speed of the water, the processor component 5 thus begins by measuring the speed of the ultrasonic measurement signal in the water, i.e. the speed of sound in the water.

The sum of the times of flight is proportional to the distance L between the upstream transducer 3a and the downstream transducer 3b, and it is inversely proportional to the speed of sound in the water.

The processor component 5 thus deduces the speed of sound in water from the sum of the times of flight.

The processor component 5 then estimates the temperature of the water from the speed of sound in the water.

Figure 3:
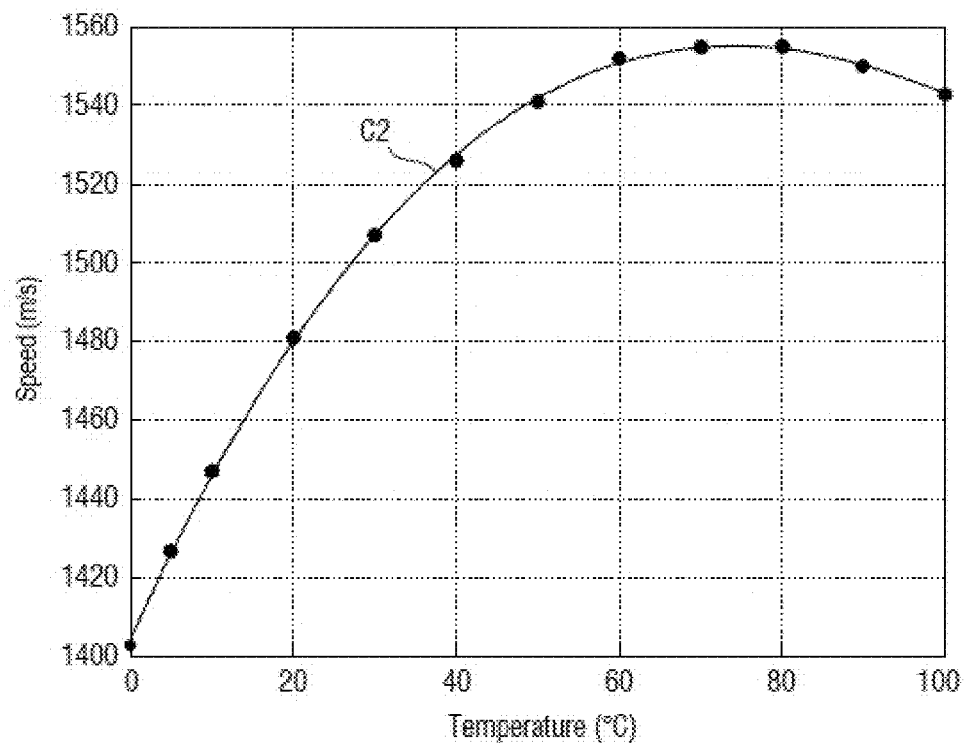
FIG. 3 shows a graph comprising a curve plotting variation in the speed of sound in water as a function of temperature.

The curve C2 of FIG. 3 shows how the speed of sound in water varies as a function of the temperature of the water, which temperature varies over the range 0.1° C. to 100° C. in the graph. As explained above, this curve C2 presents a point of inflection at about 74° C.: the curve increases up to 74° C. and decreases above 74° C. Because at this point of inflection, the same speed of sound in the water can correspond to two different values for the temperature of the water. Thus, by way of example, for the same speed of sound in water of 1542 meters per second (m/s), the temperature of the water may equal either to 50° C. or else to 100° C.

Figure 4:
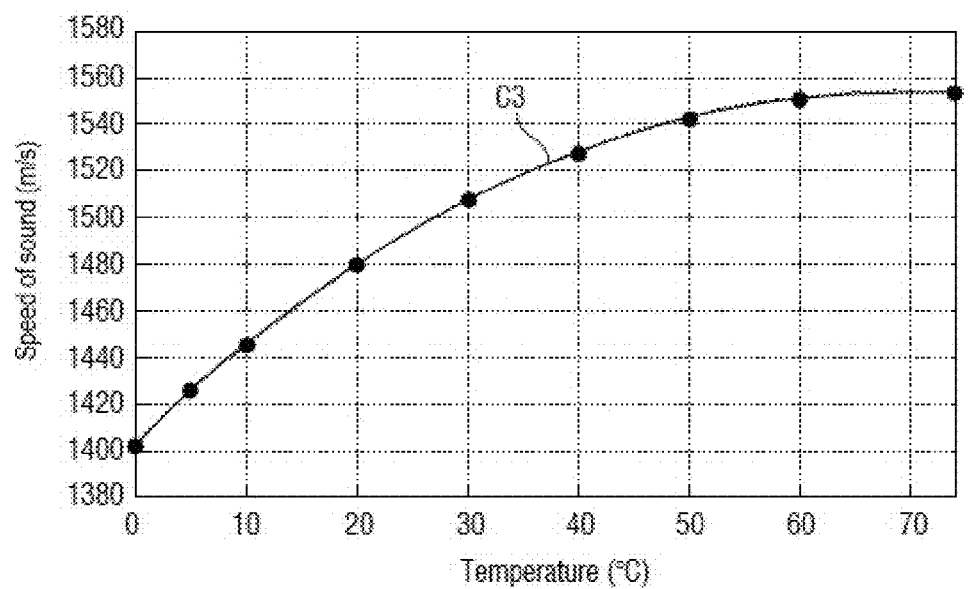
FIG. 4 shows a graph comprising a curve plotting a quadratic function that approximates the curve of FIG. 3 before the point of inflection at 74° C.
Figure 5:
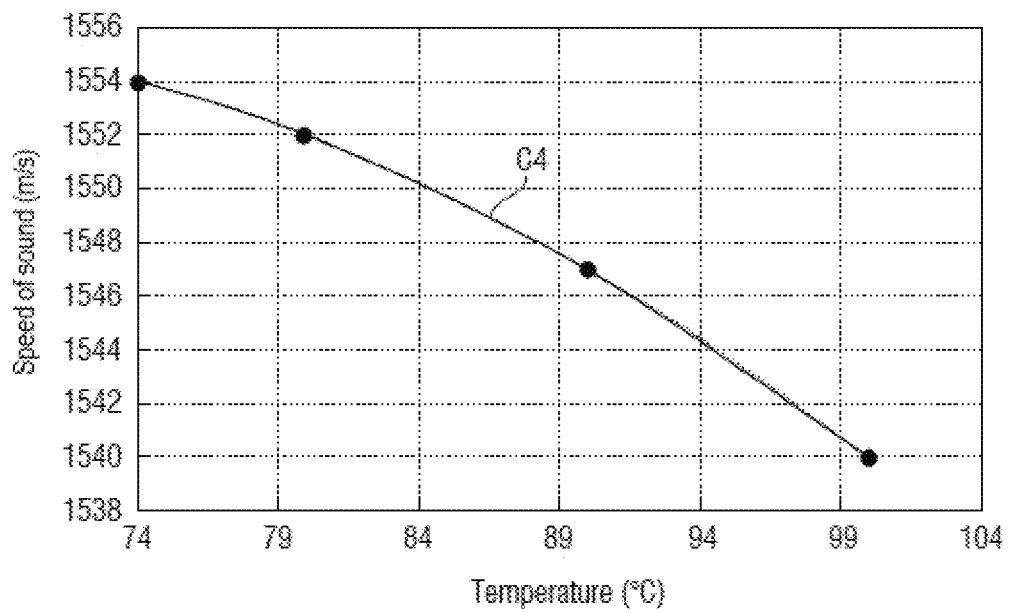
FIG. 5 shows a graph comprising a curve plotting a quadratic function that approximates the curve of FIG. 3 after the point of inflection at 74° C.

The curve C2 may be approximated by two quadratic function curves. The curve C3, as shown in FIG. 4, corresponds to the water having temperatures lower than 74° C. The curve C4, as shown in FIG. 5, corresponds to the water having temperatures higher than 74° C.

The curve C3 is defined between 0° C. and 74° C. by the following first equation:

$$Vs = -0.0325 \times T^2 + 4.4218 \times T + 1403.9,$$

where Vs is the speed of sound in water and where T is the temperature of the water.

The curve C4 is defined between 74° C. and 100° C. by the following second equation:

$$Vs = -0.0101 \times T^2 + 1.226 \times T + 1518.8.$$

To determine which equation should be used in order to find the "right" temperature that corresponds to the estimated speed of sound in water, and thus lift the uncertainty associated with the fact that two distinct temperatures (one above 74° C. and the other below) can correspond exactly to the same speed of sound, the processor component 5 measures the level of the measurement electrical signal, and then determines from the level of the electrical measurement signal whether the temperature of the water is less than or greater than 74° C.

Specifically, the level of the electrical measurement signal can produce an estimate of the temperature of the water that is relatively inaccurate, but that is sufficient to determine whether the temperature of the water is less than or greater than 74° C., and thus whether it is the first equation or the second equation that should be for estimating the temperature of the water accurately.

Figure 6:
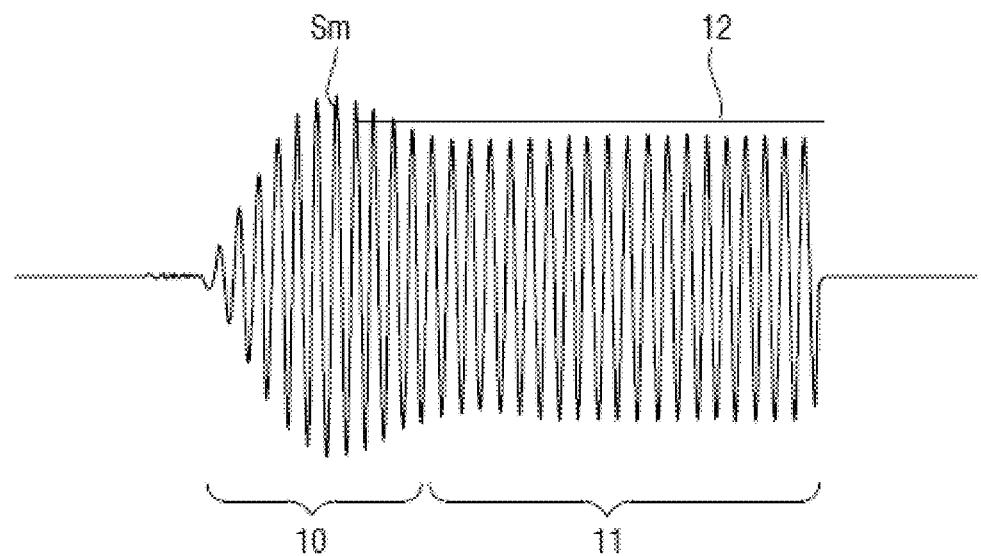
FIG. 6 shows a graph comprising a curve plotting the electrical measurement signal as a function of time.

FIG. 6 shows the electrical measurement signal Sm. The electrical measurement signal Sm comprises a first portion 10 and a second portion 11. In the first portion 10, the amplitude of the electrical measurement signal Sm increases considerably and then decreases. In the second portion 11, the amplitude of the electrical measurement signal Sm is relatively constant.

In this example, the amplitude of electrical measurement signal Sm is greater in the first portion 10, which is due to the fact that the excitation frequency of the emitter transducer does not correspond exactly to its resonant frequency. Naturally, it would be possible to select an excitation frequency that is equal to the resonant frequency of the emitter transducer.

In this example, the level of the electrical measurement signal Sm that is used is the level of the "plateau" 12 in the second portion 11 of the electrical measurement signal Sm. More precisely, in this example, the level of the electrical measurement signal Sm is equal to the mean of the amplitudes of a plurality of lobes (e.g. ten lobes), said lobes being situated in the middle of a portion of the electrical measurement signal Sm in which said electrical measurement signal Sm presents an amplitude that is substantially constant (i.e. in the middle of the second portion 11).

Figure 7:
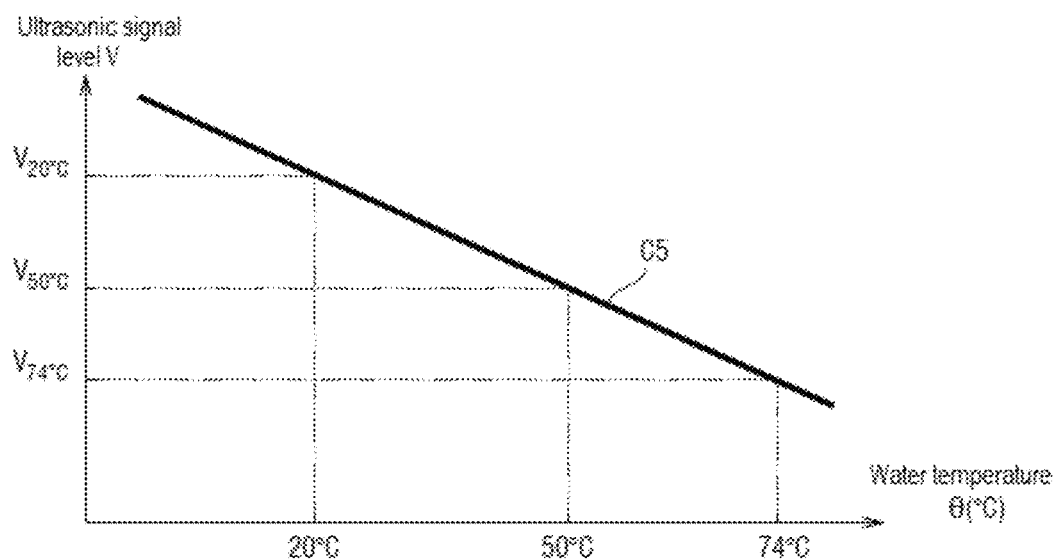
FIG. 7 shows the graph comprising a curve plotting the level expected for the electrical measurement signal as a function of water temperature.

It has been found that the level of the electrical measurement signal decreases linearly with increasing temperature. The linear curve C5, as shown in FIG. 7, gives the level of the electrical measurement signal as expected by the meter 1 as a function of the temperature of the water.

In order to determine whether the temperature of the water is less than or greater than 74° C., the processor component 5 compares the level of electrical measurement signal with the level that is to be expected for the water having a temperature equal to 74° C. The level that is to be expected for a temperature of 74° C. is determined by knowing a first reference level for the electrical measurement signal as previously measured during a stage of calibrating the meter 1 while the water is at a temperature equal to a first reference temperature, and by using a reference factor. The reference factor is a percentage corresponding to the variation in the level of the electrical measurement signal that is to be expected from the difference between the first reference temperature and 74° C.

The processor component 5 compares the level of electrical measurement signal Sm with a predefined threshold that is equal to the first reference level of the electrical measurement signal multiplied by the reference factor.

By way of example, the first reference temperature is equal to 20° C.

Prior to putting the meter into service, the reference factor is calculated from at least one second reference level of the electrical measurement signal as measured while the temperature of the water is equal to a second reference temperature and from a third reference level of the electrical measurement signal as measured while the temperature of the water is equal to a third reference temperature.

The second reference level, the third reference level, and the reference factor may be measured during the stage of calibrating the meter 1. Thus, during said calibration stage, the level of electrical measurement signal is measured in the meter 1 when the water has a temperature equal to the second reference temperature in order to obtain the second reference level, and then the level of electrical measurement signal is measured in the meter 1 when the water has a temperature equal to the third reference temperature in order to obtain the third reference level. The reference factor that is obtained is specific to the meter 1. Naturally, under such circumstances, it is advantageous for the second reference temperature (or indeed the third reference temperature) to be equal to the first reference temperature, and thus for the second reference level (or indeed the third reference level) to be equal to the first reference level, since two measurement points then suffice to define the reference factor and the first reference level as used in operation.

By way of example, the second reference temperature is equal to 20° C. and the third reference temperature is equal to 50° C.

Alternatively, the linear curve C5 may be obtained from measurements carried out on a large number of meters similar to the meter 1. By way of example, meters that are "similar" may be meters that have the same part number (P/N) as the meter 1. The "large number" of meters is such as to enable a linear curve to be defined that is representative of the level to be expected of the electrical measurement signal and that is pertinent for all of the meters similar to the meter 1. Under such circumstances, the second reference level and the third reference level are measured for a plurality of other meters similar to said meter 1, and the reference factor that is used is common to a plurality of meters.

For example, the following may apply for the meter 1:

$$N(74° C.) = 0.7 \times N(20° C.),$$

where N(74° C.) is the expected level of electrical measurement signal for the water being at a temperature equal to 74° C., where N(20° C.) is the first reference level (i.e. the level of the electrical measurement signal is measured during the calibration stage at the first reference temperature, specifically equal to 20° C.), and 0.7 is the reference factor.

The reference factor is equal to 0.7, which means that in operation, for the meter 1, the expected level of the electrical measurement signal at 74° C. is equal to 0.7 times the level at 20° C. (the first reference level).

Thus, in operation and in order to determine whether the temperature of the water is less than or greater than 74° C., the processor component 5 compares the level of electrical measurement signal with the predefined threshold that, in this example, is equal to:

$$0.7 \times N(20° \text{ C.}).$$

From this comparison, the processor component 5 deduces whether the temperature of the water is less than or greater than 74° C.: if the level of electrical measurement signal is greater than a predefined threshold, then the processor component deduces that the temperature of the water is less than 74° C., and if the level of electrical measurement signal is less than the predefined threshold, then the processor component 5 deduces that the temperature of the water is greater than 74° C.

The processor component 5 then produces an accurate estimate of the temperature of the water from the speed of the ultrasonic measurement signal by applying one or the other of the equations for variation in the speed of sound. The processor component 5 uses a first formula derived from the above-described first equation if the temperature of the water is less than 74° C., and a second formula derived from the second equation if the temperature of the water is greater than 74° C.

It should be observed that the first and second equations are both quadratic approximations to a curve (the curve C2 of FIG. 3), which is itself a portion the curve for a function of the fifth degree. Using formulae that are derived from curves of the second degree is highly advantageous in terms of the calculation resources needed in the processor component 5 in order to perform the invention.

The processor component 5 then corrects the measurement of the water flow rate as a function of the estimated temperature of the water.

Figure 8:
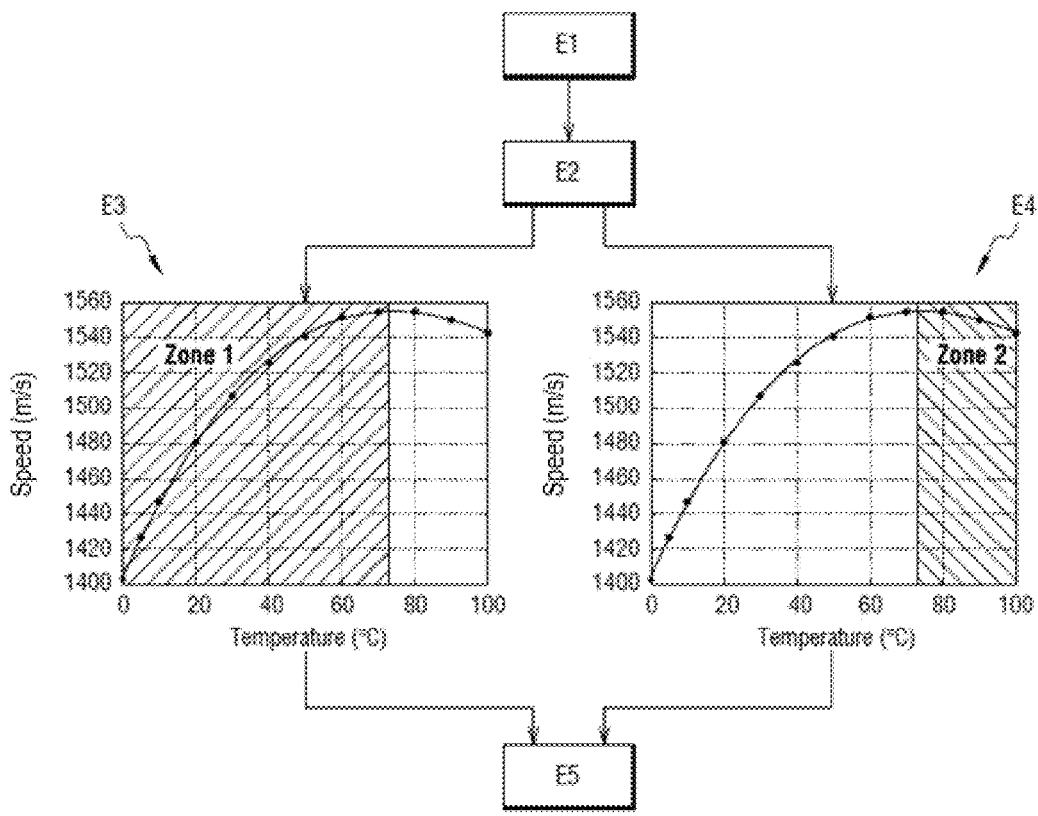
FIG. 8 shows steps of the measurement method of the invention.

The main steps performed for evaluating the temperature of the water in operation are summarized in FIG. 8.

The processor component 5 begins by measuring the level of the electrical measurement signal (step E1).

The processor component 5 then compares the level of electrical measurement signal Sm with the predefined threshold that is equal to the first reference level of the electrical measurement signal multiplied by the reference factor (step E2).

If the level of electrical measurement signal is strictly greater than the predefined threshold, then the processor component 5 deduces that the temperature of the water is strictly less than 74° C., and it selects the first formula (step E3). If the measured level of the electrical measurement signal is less than or equal to the predefined threshold, then the processor component 5 deduces that the temperature of the water is greater than or equal to 74° C., and it selects the second formula (step E4).

The processor component 5 then calculates the temperature of the water accurately by using the selected formula (step E5).

Naturally, the invention is not limited to the embodiment described, but covers any variant coming within the ambit of the invention as defined by the claims.

The number of transducers in the ultrasonic measurement device need not necessarily be equal to two. By way of example, it is possible to provide only one transducer that emits an ultrasonic measurement signal, which is reflected by a reflecting element incorporated in the pipe, and which is acquired by said transducer. The single transducer performs in succession the function of the emitter transducer and the function of the receiver transducer on the same ultrasonic measurement signal.

In the above description of an implementation of the invention, all of the steps of the measurement method are performed in the processor component of the meter. Nevertheless, the measurement method could be performed in a plurality of components, or indeed it could potentially be performed at least in part outside the meter. For example, the temperature of the water could be estimated and the flow rate could be corrected in another meter, in a data concentrator, or in a server that is remote from the meter.

The invention may be implemented in a water meter or in a thermal energy meter. The water may be fresh water or salt water.

The inflection temperature that is taken into account need not necessarily be equal exactly to 74° C., but it could be equal to about 74° C., example it could lie in the range 74° C.±2° C.

The invention claimed is:

1. A measurement method for measuring the temperature of water, the method being performed at least in part in a meter and comprising the steps of:
    causing an emitter transducer of the meter to emit an ultrasonic measurement signal, and acquiring an electrical measurement signal produced by a receiver transducer of the meter when it receives the ultrasonic measurement signal after the ultrasonic measurement signal has travelled along a path of defined length in the water;
    measuring a speed of the ultrasonic measurement signal in the water;
    measuring a level of the electrical measurement signal;
    using only the level of the electrical measurement signal to determine whether the temperature of the water is less than or greater than an inflection temperature corresponding to a point of inflection in a curve plotting the speed of sound in water as a function of the temperature of the water;
    estimating the temperature of the water from the speed of the ultrasonic measurement signal by using a first formula if the temperature of the water is less than the inflection temperature, and by using a second formula if the temperature of the water is greater than the inflection temperature,
    wherein said estimating the temperature of the water is done without using a temperature sensor.

2. The measurement method according to claim 1, further comprising:
    estimating a flow rate for the water by using the speed of the ultrasonic measurement signal; and of
    correcting the flow rate of the water by using the temperature of the water as estimated by the measurement method.

3. The measurement method according to claim 1, wherein the first formula and the second formula result respectively from a first equation and from a second equation for the speed of sound in water as a function of the temperature of the water, the first equation and the second equation being equations of the second degree.

4. The measurement method according to claim 3, wherein the first equation is:

$$Vs = -0.0325 \times T^2 + 4.4218 \times T + 1403.9$$

and the second equation is:

$$Vs = -0.0101 \times T^2 + 1.226 \times T + 1518.8,$$

where Vs is the speed of sound in water and where T is the temperature of the water.

5. The measurement method according to claim 1, wherein the inflection temperature lies in the range 74° C.±2° C.

6. A meter including at least one transducer and a processor component arranged to perform the measurement method according to claim 1.

7. The meter according to claim 6, wherein the meter is a water meter.

8. The meter according to claim 6, wherein the meter is a thermal energy meter.

9. A non-transitory, computer-readable storage medium storing a computer program including instructions that cause the processor component of the meter according to claim 6 to execute a measurement method for measuring the temperature of water, the method being performed at least in part in a meter and comprising:
  causing an emitter transducer of the meter to emit an ultrasonic measurement signal, and acquiring an electrical measurement signal produced by a receiver transducer of the meter when it receives the ultrasonic measurement signal after the ultrasonic measurement signal has travelled along a path of defined length in the water;
  measuring a speed of the ultrasonic measurement signal in the water;
  measuring a level of the electrical measurement signal;
  using the level of the electrical measurement signal to determine whether the temperature of the water is less than or greater than an inflection temperature corresponding to a point of inflection in a curve plotting the speed of sound in water as a function of the temperature of the water;
  estimating the temperature of the water from the speed of the ultrasonic measurement signal by using a first formula if the temperature of the water is less than the inflection temperature, and by using a second formula if the temperature of the water is greater than the inflection temperature.

10. A measurement method for measuring the temperature of water, the method being performed at least in part in a meter and comprising:
  causing an emitter transducer of the meter to emit an ultrasonic measurement signal, and acquiring an electrical measurement signal produced by a receiver transducer of the meter when it receives the ultrasonic measurement signal after the ultrasonic measurement signal has travelled along a path of defined length in the water;
  measuring a speed of the ultrasonic measurement signal in the water;
  measuring a level of the electrical measurement signal;
  using the level of the electrical measurement signal to determine whether the temperature of the water is less than or greater than an inflection temperature corresponding to a point of inflection in a curve plotting the speed of sound in water as a function of the temperature of the water;
  estimating the temperature of the water from the speed of the ultrasonic measurement signal by using a first formula if the temperature of the water is less than the inflection temperature, and by using a second formula if the temperature of the water is greater than the inflection temperature; and
  for determining whether the temperature of the water is less than or greater than the inflection temperature, comparing the level of the electrical measurement signal with a predefined threshold that is equal to a first reference level of the electrical measurement signal multiplied by a reference factor, the first reference level being previously measured during a stage of calibrating the meter while the temperature of the water is equal to a first reference temperature, and the reference factor corresponding to the variation in the level of the electrical measurement signal that is to be expected form the temperature difference between the first reference temperature and the inflection temperature.

11. The measurement method according to claim 10, wherein prior to putting the meter into service, the reference factor is calculated from at least one second reference level of the electrical measurement signal as measured while the temperature of the water is equal to a second reference temperature and from a third reference level of the electrical measurement signal as measured while the temperature of the water is equal to a third reference temperature.

12. The measurement method according to claim 11, wherein the second reference level and the third reference level are measured during the stage of calibrating said meter, the reference factor then being specific to said meter.

13. The measurement method according to claim 11, wherein the second reference level and the third reference level are measured for a plurality of other meters similar to said meter, and the reference factor is then common to a plurality of meters.

14. A measurement method for measuring the temperature of water, the method being performed at least in part in a meter and comprising:
  causing an emitter transducer of the meter to emit an ultrasonic measurement signal, and acquiring an electrical measurement signal produced by a receiver transducer of the meter when it receives the ultrasonic measurement signal after the ultrasonic measurement signal has travelled along a path of defined length in the water;
  measuring a speed of the ultrasonic measurement signal in the water;
  measuring a level of the electrical measurement signal;
  using the level of the electrical measurement signal to determine whether the temperature of the water is less than or greater than an inflection temperature corresponding to a point of inflection in a curve plotting the speed of sound in water as a function of the temperature of the water; and
  estimating the temperature of the water from the speed of the ultrasonic measurement signal by using a first formula if the temperature of the water is less than the inflection temperature, and by using a second formula if the temperature of the water is greater than the inflection temperature,
  wherein the level of the electrical measurement signal is equal to the mean of the amplitudes of a plurality of lobes, said lobes being situated in the middle of a portion of the electrical measurement signal in which said electrical measurement signal presents an amplitude that is substantially constant.

* * * * *